(12) United States Patent
Carbone et al.

(10) Patent No.: US 9,648,977 B2
(45) Date of Patent: May 16, 2017

(54) INFANT FORMULA DEVICE

(71) Applicant: Q Holdings LLC, New York, NY (US)

(72) Inventors: Philip C. Carbone, North Reading, MA (US); Kyle McKenney, Somerville, MA (US); Charles Marble, Brockton, MA (US); Karen Benedek, Winchester, MA (US); Nathan Ayer, Weybridge, VT (US); Scott Hardy, Charlotte, VT (US); Warren Ellis, Worcester, MA (US); Nicholas Lazaris, Waban, MA (US)

(73) Assignee: Q Holdings LLC, New York, NY (US)

( * ) Notice: Subject to any disclaimer, the term of this patent is extended or adjusted under 35 U.S.C. 154(b) by 0 days.

(21) Appl. No.: 15/014,340

(22) Filed: Feb. 3, 2016

(65) Prior Publication Data
US 2016/0353917 A1 Dec. 8, 2016

Related U.S. Application Data

(63) Continuation of application No. 13/378,425, filed as application No. PCT/US2010/038929 on Jun. 17, 2010, now abandoned.

(Continued)

(51) Int. Cl.
A47J 31/40 (2006.01)
A23L 2/39 (2006.01)
A23L 33/00 (2016.01)

(52) U.S. Cl.
CPC ............... *A47J 31/404* (2013.01); *A23L 2/39* (2013.01); *A23L 33/40* (2016.08); *A47J 31/40* (2013.01); *A23V 2002/00* (2013.01)

(58) Field of Classification Search
CPC ....................................................... A47J 31/40
(Continued)

(56) References Cited

U.S. PATENT DOCUMENTS

| 617,866 A | 1/1899 | Somasco | |
| 856,619 A * | 6/1907 | Camp et al. | .......... B01F 9/0021 366/214 |

(Continued)

FOREIGN PATENT DOCUMENTS

| AR | 051188 | 7/2007 |
| CL | 2984-04 | 2/2006 |

(Continued)

OTHER PUBLICATIONS

International Search Report dated Dec. 23, 2010 received in PCT/US10/38929 2 pages.

*Primary Examiner* — David Sorkin
(74) *Attorney, Agent, or Firm* — Hard IP LLC

(57) ABSTRACT

An apparatus is provided for accurately dispensing a powder such as powdered infant formula into a container, and pasteurizing and reconstituting the powdered formula while completely mixing the formula in the container. The apparatus includes a hopper assembly for storing powder, a dosing assembly for measuring and dispensing powder from a receptacle into the container, a dilution assembly and a mixing assembly for obtaining accurately and completely mixed formula from the dispensed powder. The hopper is shaped to promote powder bridging, and the resulting powder bridge is used in combination with the dosing assembly to provide a predetermined amount of powder using a single mechanical valve that is isolated from the powder. The mixing assembly mixes the contents of the container while holding the bottle at a fixed angle relative to the vertical. A (Continued)

method of providing pasteurized infant formula from an infant formula powder is also disclosed.

20 Claims, 10 Drawing Sheets

Related U.S. Application Data

(60) Provisional application No. 61/187,949, filed on Jun. 17, 2009.

(58) Field of Classification Search
USPC .......... 366/183.1, 183.3, 210, 211, 213, 214
See application file for complete search history.

(56) References Cited

U.S. PATENT DOCUMENTS

| | | |
|---|---|---|
| 2,846,200 A | 8/1958 | Jamison |
| 2,860,598 A | 11/1958 | Loesche |
| 2,944,799 A | 7/1960 | Larson |
| 3,163,404 A | 12/1964 | Kraft et al. |
| 3,777,652 A | 12/1973 | Engel |
| 4,212,546 A | 7/1980 | Porteous |
| 4,245,680 A | 1/1981 | Greenfield et al. |
| 5,704,711 A | 1/1998 | Simmons |
| 5,797,313 A | 8/1998 | Rothley |
| 5,952,032 A | 9/1999 | Mordini et al. |
| 6,173,117 B1 | 1/2001 | Clubb |
| 6,829,431 B1 | 12/2004 | Haven et al. |
| 2004/0118871 A1 | 6/2004 | Coronado et al. |
| 2007/0202227 A1 | 8/2007 | Thakur et al. |
| 2008/0066483 A1 | 3/2008 | Klier et al. |
| 2011/0163127 A1 | 7/2011 | Dibella-Lenaway |

FOREIGN PATENT DOCUMENTS

| | | |
|---|---|---|
| CL | 1676-06 | 10/2006 |
| CL | 0739-07 | 11/2007 |
| CL | 3857-08 | 1/2010 |
| CL | 3338-08 | 5/2010 |
| CN | 2566941 | 8/2003 |
| CN | 1725968 | 1/2006 |
| CN | 201190001 | 2/2009 |
| CN | 101421172 | 4/2009 |
| CN | 201253134 | 6/2009 |
| JP | 2002-150874 | 5/2002 |
| WO | 03/084377 | 10/2003 |
| WO | 2005/053489 | 6/2005 |
| WO | 2006/066339 | 6/2006 |
| WO | 2009/059938 | 5/2009 |
| WO | 2009/080596 | 7/2009 |
| WO | 2010148160 | 12/2010 |

* cited by examiner

INFANT FORMULA DEVICE

CROSS-REFERENCE TO RELATED APPLICATIONS

This application is a continuation of U.S. application Ser. No. 13/378,425, filed on Dec. 15, 2011, which is the National Stage of International Application No. PCT/US2010/038929, filed on Jun. 17, 2010, which claims the priority of U.S. Provisional Application No. 61/187,949, filed on Jun. 17, 2009. The contents of these applications are hereby incorporated by reference in their entirety.

BACKGROUND OF THE INVENTION

This invention relates to an apparatus for dispensing, reconstituting and mixing a beverage from a powder, and related methods.

Although liquid infant formulas are available, powdered infant formula (PIF) is widely used due to its portability, ease and length of storage, and relative inexpense. However, preparation of formula from PIF can be messy and inconvenient, and the PIF can be contaminated during handling and preparation. To address these issues, automated infant formula preparation devices have been developed. Although using an automated infant formula preparation device to prepare the infant formula can avoid contamination associated with PIF handling, PIF as provided by the manufacturer is not guaranteed to be free of microorganisms that can cause illness or spoilage. In order to guarantee an infant formula from PIF that is free from such microorganisms, the reconstituted PIF should be heated to temperatures hotter than 160 degrees F. for at least 15 seconds. Once heated, the resulting liquid must then be cooled down to a safe drinking temperature.

In addition to providing microorganism free formula, automated infant formula preparation devices must address other issues. For example, PIF is difficult to pour and difficult to meter because the infant formula granules are irregular and are prone to bridging, packing, or sticking to itself or to the container walls. Automating the PIF dispensing process is difficult because the PIF does not pour consistently or repeatably, and because each type of PIF flows and packs differently. Each type of PIF requires a slightly different volume of powder to be dispensed for a common volume of reconstituted formula. It is difficult to reconstitute the PIF into a homogeneous liquid that is free of bubbles and/or powder lumps. The very light powder has a tendency to be carried in the air to other parts of the machine which can cause difficulty in cleaning the device or maintaining reliable mechanism operation. In addition, an automated infant formula device must be low cost and be easily cleaned and maintained.

SUMMARY

In one aspect, an apparatus is provided for preparing within a container a reconstituted beverage from a powder. The apparatus includes a receptacle configured to contain the powder and a measuring device configured to receive the powder from the receptacle and dispense the powder into the container. The apparatus further includes a liquid supply configured to dispense liquid into the container, and a mixing device configured to mix the contents of the container while supporting the container such that a closed base end of the container is disposed at an angle relative to the horizontal.

In another aspect, an apparatus is provided for preparing within a container a reconstituted beverage from a powder. The apparatus includes a receptacle configured to contain the powder, the receptacle including an open first end having a first dimension, an open second end opposed to the first end and having a second dimension, and a sidewall connecting the first and second ends, a portion of the sidewall being angled so as to converge from the first end to the second end, the portion having an angle configured to cause powder bridging at or above the second end. The apparatus further includes a measuring device configured to receive powder from the second end of the receptacle and dispense a predetermined amount into the container, the predetermined amount of powder corresponding to the sum of a volume of the measuring device and the volume of powder disposed below the bridge formed by the powder bridging. The apparatus may further include a liquid supply configured to dispense liquid into the container.

In either aspect, the apparatus may include one or more of the following features if not already included: The apparatus may further include a mixing device configured to mix the contents of the container. The mixing device is configured to mix the contents of the container while supporting the container such that a closed base end of the container is disposed at an angle relative to the horizontal. The mixing device is configured to mix the contents of the container by rotation of the container about an axis perpendicular to the base end. The mixing device is configured to mix the contents of the container by alternating the rotation of the container between opposed rotation directions. The mixing device is configured to mix the contents of the container by including a period of container non-rotation between periods of container rotation. The angle of an axis perpendicular to the base end relative to the horizontal is selected from angles in the range of 45 degrees to 80 degrees. The mixing device comprises a holder configured to secure the container, and a motor configured to rotate the holder. The apparatus further comprises a vibrator configured to vibrate the receptacle for dispensing the powder from the receptacle into the measuring device. The apparatus further comprises a vibrator configured to vibrate the measuring device for dispensing the powder from the dispensing device into the container.

In either aspect, the apparatus may include one or more of the following additional features if not already included: The measuring device includes a tube having a first end connected to an outlet of the receptacle, and an open second end opposed to the first end, and the apparatus further comprises a valve disposed between the first and second ends of the tube, the valve configured to control powder flow from the second end. The tube is flexible. The tube is elastic. The cross-sectional dimension of the tube is determined based on the properties of the powder to be dispensed. The axial position of the valve relative to a longitudinal axis of the tube is adjustable, and is determined based on the amount of the powder to be dispensed. The valve is configured to selectively prevent the powder from passing through the second end of the tube. The valve is configured to control passage of powder through the tube without direct contact with the powder. The valve is a pinch valve. The valve is configured to move a sidewall of the tube between a first tube sidewall position in which the powder can pass through the tube and a second tube sidewall position in which the powder is prevented from passing through the tube.

In either aspect, the apparatus may include one or more of the following additional features if not already included: The receptacle includes an open receptacle first end having a first dimension, an open receptacle second end opposed to the receptacle first end and having a second dimension, and a receptacle sidewall connecting the receptacle first and receptacle second end. A portion of the receptacle sidewall is angled so as to converge from the receptacle first end to the receptacle second end, the portion having an angle configured to cause powder bridging at or above the receptacle second end. The measuring device includes a tube having a tube first end connected to the receptacle second end, and an open tube second end opposed to the tube first end, and the apparatus further comprises a valve disposed between the tube first and second ends, the valve configured to control powder flow from the tube second end. The predetermined amount of powder corresponds to the sum of a volume of the measuring device above the valve and the volume of powder disposed below the bridge formed by the powder bridging. The receptacle sidewall converges at an angle in the range of 35 to 65 degrees relative to a longitudinal axis of the receptacle. The receptacle sidewall converges at an angle of approximately 50 degrees relative to a longitudinal axis of the receptacle. The receptacle is removable from the apparatus. The receptacle is refillable. The receptacle is a prefilled and sealed disposable cartridge.

In either aspect, the apparatus may include one or more of the following additional features if not already included: The liquid supply includes a first supply tube and a second supply tube, the first and second supply tubes arranged so that the first supply tube directs fluid into the container in different direction than the second supply tube. The liquid supply includes a first supply tube and a second supply tube, the supply tubes are configured so that the first supply tube delivers liquid at a different temperature than that of the second supply tube. The liquid supply is configured so that the first supply tube delivers liquid at a temperature sufficient to pasteurize the reconstituted beverage. A chute is disposed between the measuring device and the container, the chute configured to direct the powder from the measuring device into the container such that the direction of powder flow is changed between the measuring device and the container. A sensor is included that is configured to detect powder flow from the measuring device.

In another aspect, a method of preparing a reconstituted beverage within a container from a powder is provided. The method includes the following method steps: Placing a container in a mixing device. Rotating the container using the mixing device. While the container rotates, dispensing a predetermined amount of the powder from a measuring device into the container, and delivering at least a portion of a total required dilution amount of liquid to the container. Continuing to rotate the container for a predetermined time period after the dispensing and delivering steps.

The method may include one or more of the following additional features: Delivering at least a portion of a total required dilution amount of liquid to the container includes delivering the liquid so that it is directed toward a sidewall of the container. Following the step of continuing to rotate with a step of adding sufficient liquid to the container, so that the sum of the liquid delivered in the delivering step and in the step of adding sufficient liquid equals the total required dilution amount. The step of rotating is performed while a base end of the container is oriented at an angle to the horizontal. At least a portion of the dispensing and delivering steps occurs simultaneously. The step of continuing to rotate the container includes reversing the direction of rotation for at least a portion of the duration of the step. The steps of delivering and continuing to rotate are repeated. The steps of delivering and continuing to rotate are repeated, and at least one of the repeated steps is performed using a liquid of a different temperature. The step of delivering is performed using a liquid provided at a temperature sufficient to pasteurize the reconstituted beverage. The liquid supply includes a first supply tube and a second supply tube, the first and second supply tubes arranged so that the first supply tube directs fluid into the container in different direction than the second supply tube, the steps of delivering and continuing to rotate are repeated, at least one of the repeated steps is performed using a liquid from the first supply tube, and at least of one the repeated steps is performed using a liquid from the second supply tube.

In still another aspect, a method of dispensing a powder into a container is provided. The method includes the following method step: Providing a dispensing apparatus including a receptacle configured to contain the powder, the receptacle including an open first end having a first dimension, an open second end opposed to the first end and having a second dimension, and a sidewall connecting the first and second ends, a portion of the sidewall being angled so as to converge from the first end to the second end, the portion having an angle configured to cause powder bridging at or above the second end. The dispensing apparatus also includes a measuring device configured to receive powder from the second end of the receptacle and dispense a predetermined amount into the container, the predetermined amount of powder corresponding to the sum of a volume of the measuring device and the volume of powder disposed below the bridge formed by the powder bridging. The method also includes the following method steps: Providing powder in the receptacle. Dispensing the predetermined amount of powder into the container.

The method may include one or more of the following additional features: The measuring device includes a tube having an open tube first end connected to the second end of the receptacle, and an open second tube end opposed to the tube first end, and the dispensing apparatus further comprises a valve disposed between the first and second tube ends. The valve is configured to control powder flow from the second tube end, and the step of dispensing includes opening the valve to permit the predetermined amount of powder to move from the second tube end into the container. The step of dispensing further includes formation of the bridge within the receptacle. The measuring device further comprises a tube vibrator configured to apply at least one pulse to the tube, and the step of dispensing further includes the method step of actuating the tube vibrator. The step of actuating the tube vibrator is performed following the step of opening the valve. The dispensing apparatus further comprises a receptacle vibrator configured to apply at least one pulse to the receptacle, and the method further includes the method step of actuating the receptacle vibrator. The step of actuating the receptacle vibrator precedes the step of dispensing. The measuring device further comprises a tube vibrator configured to apply at least one pulse to the tube, and the step of dispensing further includes the method step of actuating the tube vibrator. The step of actuating the receptacle vibrator precedes the step of dispensing, and the step of actuating the tube vibrator is performed following the step of opening the valve. A method of preparing a reconstituted beverage within a container from a powder includes providing a preparing device including the dispensing apparatus, a liquid supply configured to dispense liquid into the container and a mixing device configured to mix the contents of the container; placing the container in the preparing device; dispensing the predetermined amount of powder into the container; delivering at least a portion of a total required dilution amount of liquid to the container; and mixing using the mixing device.

The receptacle is shaped to promote powder bridging in a manner that combined with the dosing assembly provides a predetermined amount of powder using a single mechanical valve that is isolated from the powder. Thus, although powder bridging is often considered in the art to be disadvantageous, the device disclosed herein takes advantage of this property, and uses it to achieve accurate, repeatable dosing of powder and to do so using relatively few mechanisms within the device.

The mixing assembly mixes the contents of the container while holding the bottle at a fixed angle relative to the vertical to achieve full and uniform mixing of the PIF, even for high concentrations of PIF. The resulting formula is substantially free from lumps or bubbles.

A method of providing pasteurized infant formula from an infant formula powder is also disclosed. The method provides pasteurization and subsequent cooling to quickly and easily provide a formula at a desired temperature, for example, body temperature.

Modes for carrying out the present invention are explained below by reference to an embodiment of the present invention shown in the attached drawings. The above-mentioned object, other objects, characteristics and advantages of the present invention will become apparent from the detailed description of the embodiment of the invention presented below in conjunction with the attached drawings.

DETAILED DESCRIPTION

Figure 1:
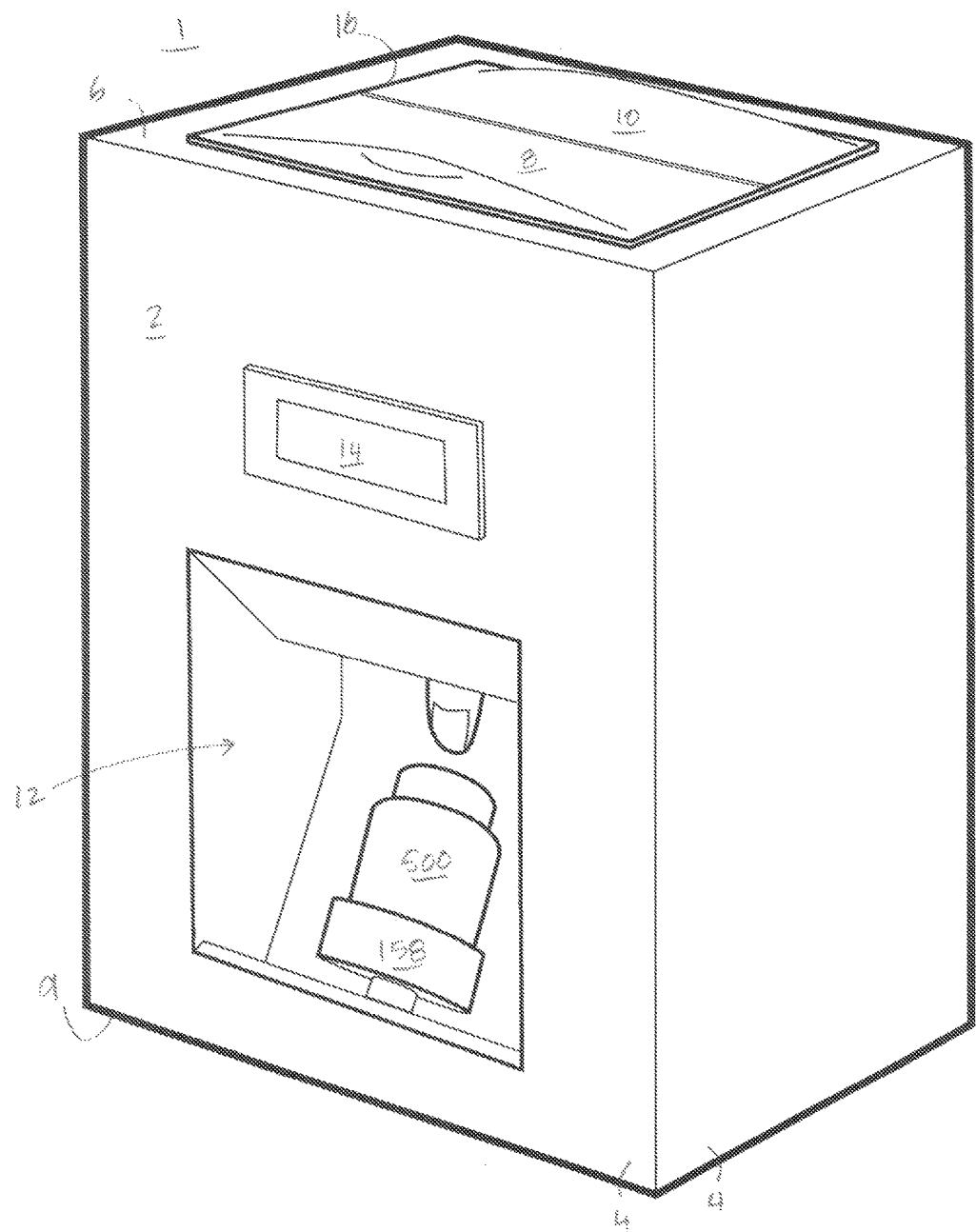
FIG. 1 is a front perspective view of an automated infant formula device.
Figure 2:
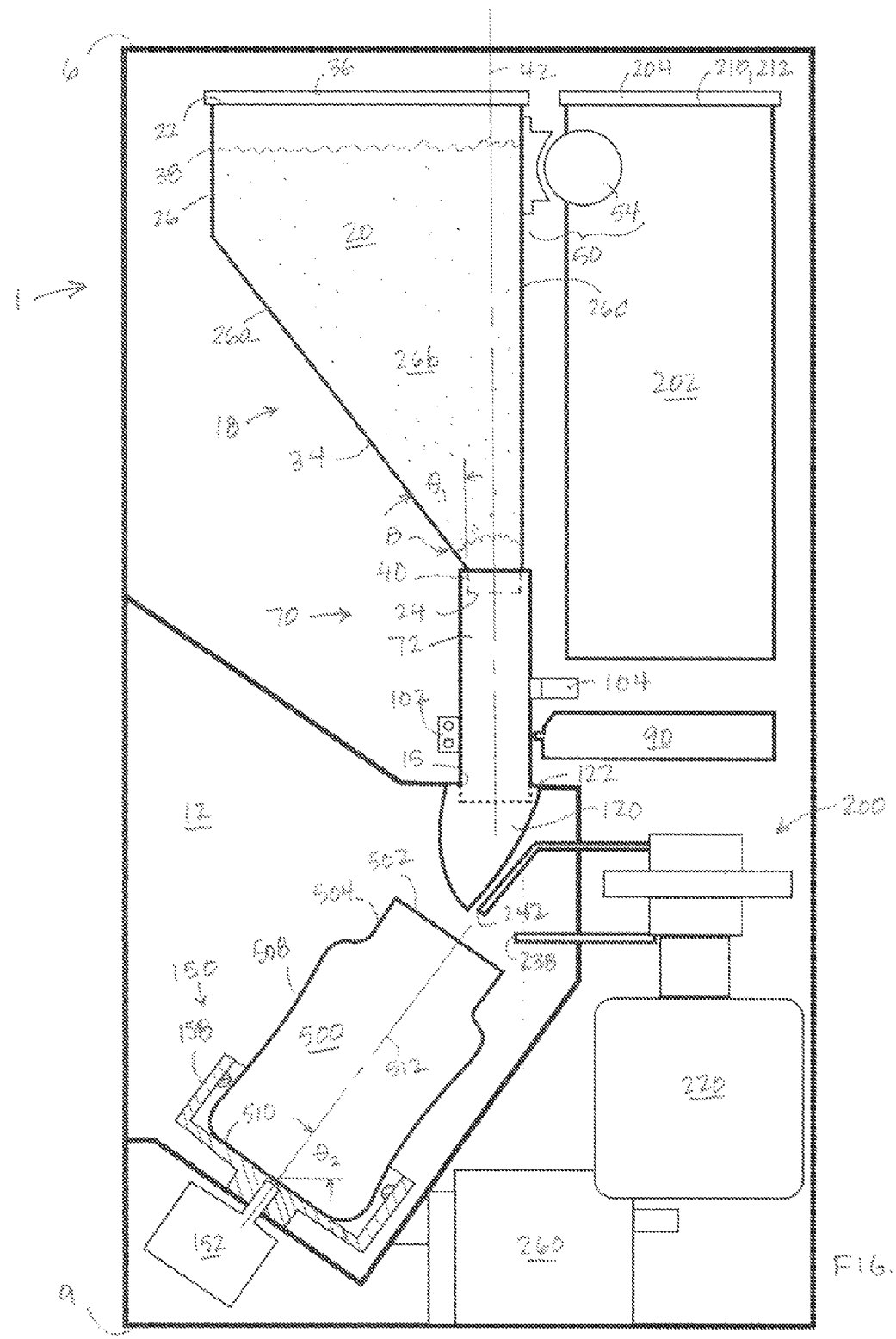
FIG. 2 is a schematic side view of the interior of the device of FIG. 1.

Referring now to FIGS. 1 and 2, the automated infant formula device 1 includes a hopper assembly 18, a dosing assembly 70, a dilution assembly 200, and a mixing assembly 150 enclosed within a housing 2. These assemblies 18, 70, 200, 150 are used to automatically prepare a reconstituted and pasteurized infant formula from a powder, and are described in detail below. The device 1 receives a serving container 500, such as a baby bottle, and is designed to dispense PIF and the dilution fluid (e.g. water) into the container 500, and then reconstitute and mix the PIF within the container 500.

The housing 2 includes sidewalls 4 and a closed top 6 and bottom 9 which provide a protective enclosure for the hopper, dosing, dilution and mixing assemblies 18, 70, 200, 150 therewithin. The top 6 of the housing 2 includes an opening 16 which is selectively opened and closed using hinged lid portions 8, 10. The lid portions 8, 10 can be lifted to provide access to the interior of the housing 2, for example to permit loading of the PIF storage receptacle 20 and water storage tank 202, which are described in detail below. A front-facing sidewall 4 supports a control panel and display 14 which permits a user to control device functions, including serving size and temperature and to view device status. The front-facing sidewall 4 also includes recess 12 into which the container 500 is inserted during device use.

In the illustrated embodiment, the container 500 is in the form of a conventional baby bottle, and includes a cylindrical body having an open top 502, a sidewall 508, and closed bottom 510. The sidewall 508 may include a reduced diameter neck portion 504 defining the size of the opening at the top 502 of the container, and the outer periphery of the neck portion 504 may include threads (not shown) to permit connection with a lid (not shown) or nipple assembly (not shown). The container 500 includes a container axis 512 perpendicular to the bottom 510 which corresponds to a longitudinal axis of the container 500.

Referring to FIG. 2, the hopper assembly 18 includes a receptacle 20 for receiving and storing PIF, and a receptacle vibrator 50 which vibrates the receptacle 20 to ensure that PIF drops from the receptacle 20 into the dosing assembly 70 as required. The receptacle 20 is a large, generally pyramid-shaped container having an open first end, or top, 22, and an open second end, or bottom, 24 disposed at a location opposed to and generally underlying the top 22. The receptacle 20 is supported on the inner surfaces of the housing 2 adjacent the upper end of the housing 2 so that the top 22 underlies the lids 8, 10. In some embodiments, the receptacle 20 can be locked in place using appropriately shaped brackets (not shown) formed on the interior surface of the housing 2. The receptacle 20 can easily be removed from the housing 2 through the opening 16 to permit cleaning. The top 22 of the receptacle 20 is covered by a lid 36 to prevent contaminants from falling into the receptacle 20, for example when the housing lids 8, 10 are opened to refill fluid storage reservoirs of the dilution assembly 200.

The top 22 of the receptacle 20 is rectangular in cross section, and is sufficiently large in dimension to facilitate refilling with PIF. The bottom 24 is circular in cross section, and is small in diameter relative to the size of the top 22. The receptacle 20 includes sidewalls 26 that extend between the top 22 and bottom 24. The sidewalls 26 include a tapered portion 34 that tapers inward from the top 22 to the bottom 24. The sidewalls 26 also include respective linear portions 38, 40 extending between the tapered portion 34 and the top 22 and bottom 24, and in parallel with a longitudinal axis 42 of the receptacle 20. In the illustrated embodiment, the receptacle 20 includes four sidewalls 26a-d (sidewall 26d is not shown since it is opposed to (behind) sidewall 26b in FIG. 2), of which three sidewalls 26a, 26b, 26d are formed having a particular taper angle $\theta_1$ relative to the axis 42. The taper angle $\theta_1$ is selected to cause bridging B of the PIF at or slightly above the second end 24 of the receptacle 20 for reasons discussed further below. The receptacle is formed so that the taper angle $\theta_1$ is in the range of 35 to 65 degrees relative to the vertical. In the illustrated embodiment, for example, the taper angle $\theta_1$ is approximately 50 degrees. In some embodiments, the linear portion 40 adjacent the bottom 24 may also include an inwardly protruding annular lip 44. The annular lip 44 is disposed adjoining the tapered portion 34 and facilitates formation of the bridge B in the same location by providing support for the PIF in the vicinity of the lip 44.

The receptacle 20 is sufficiently sized to store enough PIF for several servings. In some embodiments, the receptacle 20 can be sized to have a PIF storage capacity in a range of about 10 to 50 ounces. For example, in the illustrated embodiment, the receptacle 20 has a PIF storage capacity of 25 ounces.

The receptacle vibrator 50 is used to facilitate downward PIF movement through the receptacle 20, as discussed further below. The receptacle vibrator 50 is disposed adjacent the upper half of the receptacle 20, and includes a vibration generator 54 arranged to provide one or more mechanical pulses to the sidewall 26c of the receptacle 20. The mechanical pulses provide a vigorous, low amplitude shake of the receptacle 20.

Figure 3:
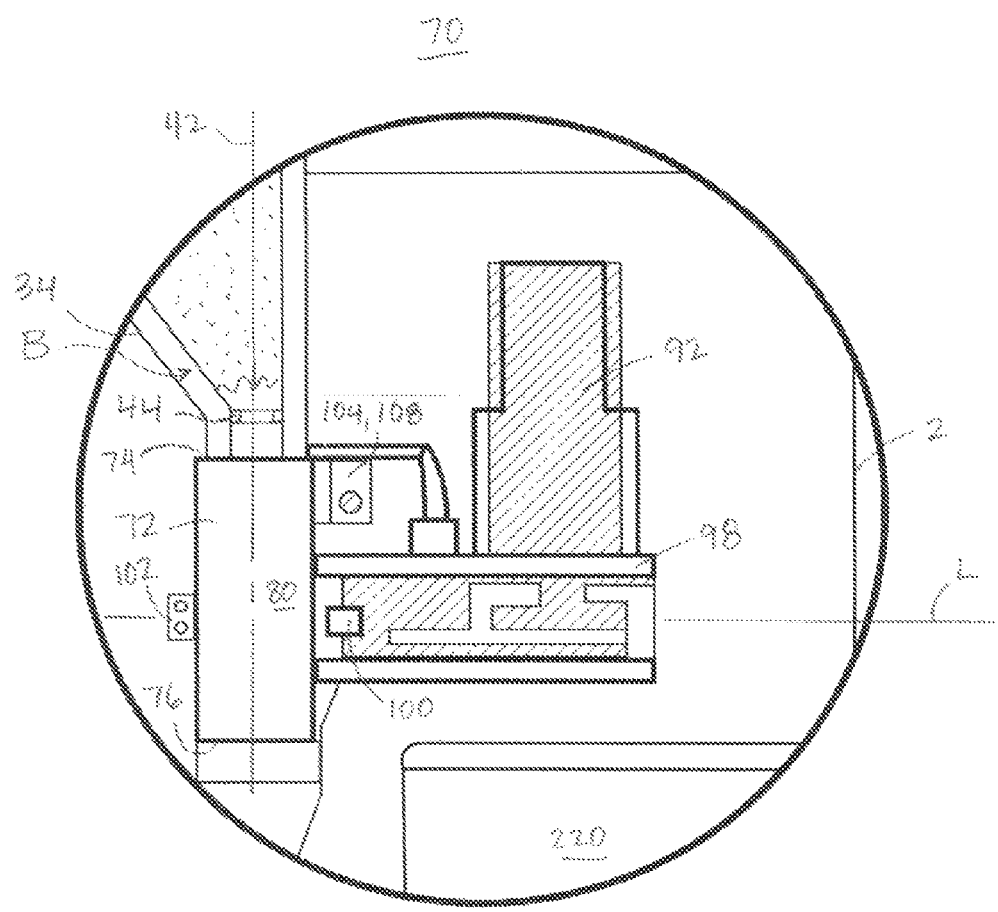
FIG. 3 is an enlarged view of the dosing assembly of the device of FIG. 1.

Referring now to FIGS. 2 and 3, the dosing assembly 70 is disposed in the housing 2 immediately below the hopper assembly 18. The dosing assembly 70 includes a dosing tube 72, a dosing tube vibrator 104, a pinch valve 90 and a chute 120.

The dosing tube 72 is a hollow cylindrical tube having an open first end 74 connected to the bottom 24 of the receptacle 20, and an open second end 76 opposed to the first end 74, and is arranged to be axially aligned with the longitudinal axis 42 of the receptacle 20. For example, the first end 74 of the dosing tube 72 may be press fit on an outer periphery of the bottom 24 of the receptacle 20. The dosing tube is 72 both flexible and elastic, and is provided with a cross-sectional dimension that is determined based on the properties of the powder to be dispensed.

The pinch valve 90 is disposed between the first and second ends 74, 76 of the dosing tube 72 and is configured to control powder flow from the second end 76 of the dosing tube 72. The pinch valve 90 includes a tube support panel 102 disposed on one side of the dosing tube 72, and a pinch blade 100 disposed on the diametrically opposed side of the dosing tube. The pinch blade 100 is supported on a block 98 that can reciprocate between a first position and a second position along a line L transverse to the longitudinal axis 42 of the receptacle 20, and is moved between the first and second positions by a valve motor 92.

The first position (FIG. 3) corresponds to an open valve position in which the block 98 and pinch blade 100 are disposed closely adjacent to, but spaced apart from, an outer periphery of the dosing tube 72, and are spaced apart from the panel 102 a distance corresponding approximately to the outer diameter of the dosing tube 72. In the open valve position, the dosing tube 72 is not compressed by the valve 90, and thus has an open, cylindrical PIF passageway 80 extending from the first end 74 to the second end 76. The second position (FIG. 4) corresponds to a closed valve position in which the block 98 and pinch blade 100 are moved to a position adjacent to the panel 102. Due to the flexibility of the dosing tube 72, the dosing tube 72 is diametrically compressed between the pinch blade 100 and the panel 102 to an extent that the passageway 80 within the dosing tube 72 is closed, and PIF is prevented from flowing out from the second end 76 of the dosing tube 72. Upon return of the valve 90 to the open position by retraction of the block 98 and pinch blade 100, the dosing tube 72 elastically regains its original cylindrical configuration.

In this configuration, the pinch valve 90 acts through the dosing tube 72 to control flow of the PIF through the dosing tube 72 in such a way that the valve 90 does not directly contact the PIF. This advantageously results in very reliable operation of the valve mechanism, since the moving parts of the valve 90 are not exposed to the sticky PIF. More importantly, since the valve blade is positioned externally of the dosing tube, dosing accuracy is enhanced since the valve blade 100 does not become coated with PIF and/or interfere with PIF flow through the passageway 80.

The pinch valve 90 is disposed adjacent to, and above, the second end 76 of the dosing tube 72. The particular position of the pinch valve 90 relative to the longitudinal axis of the dosing tube 72, along with the cross-sectional diameter of the dosing tube 72, determine the volume of the dosing tube 72 when the pinch valve 90 is in the closed position. This position is determined by the properties of the particular powder to be dispensed, as well as the total desired volume to be dispensed. In some embodiments, the position of the pinch valve within the housing 2 along the axial length of the tube can be adjusted. In other embodiments, the pinch valve 90 is fixed within the housing 2, and the position of the receptacle 20 and dosing tube 72 within the housing 2 relative to the pinch valve 90 can be adjusted.

In the device 1, the only mechanical valve provided to control PIF flow is the pinch valve 90. There is no other mechanical valve or control device within the hopper and dosing assemblies 18, 70. Instead, the device advantageously uses the powder bridging caused by the receptacle shape to provide a valve function within the receptacle 20. In particular, when the valve 90 is moved to the open position, a predetermined amount of PIF is permitted to exit the dosing assembly. The predetermined amount of powder corresponds to the sum of a volume of the measuring device above the pinch valve 90 and the volume of powder disposed below the bridge formed by the powder bridging within the receptacle 20.

The dosing tube vibrator 104 is used to urge downward PIF movement through the dosing tube, and to facilitate full evacuation of the PIF from the dosing tube once the pinch valve 90 has been moved to an open position, as discussed further below. The dosing tube vibrator 104 is disposed adjacent the dosing tube 72, and includes a vibration generator 108 arranged to provide one or more mechanical pulses to the dosing tube 72. The mechanical pulses provides a vigorous, low amplitude shake of the dosing tube 72.

Referring again to FIG. 2, the chute 120 is a rigid, curved tube positioned at the second end 76 of the dosing tube, and is used to redirect the flow direction of the PIF, so that when the pinch valve 90 is opened, PIF flows into the angled container 500. In particular, the chute 120 redirects the PIF from a flow direction which is generally aligned with the longitudinal axis 42 of the receptacle 20 as it passes through the dosing tube 72, to a flow direction which is generally aligned with the container axis 512. The chute 120 is supported in an opening 15 formed in the housing 2 at a location corresponding to the second end 76 of the dosing tube 72, so as to extend into the recess 12 in which the container 500 is received. The second end 76 of the dosing tube 72 protrudes into the open upper end 122 of the chute 120.

Figure 4:
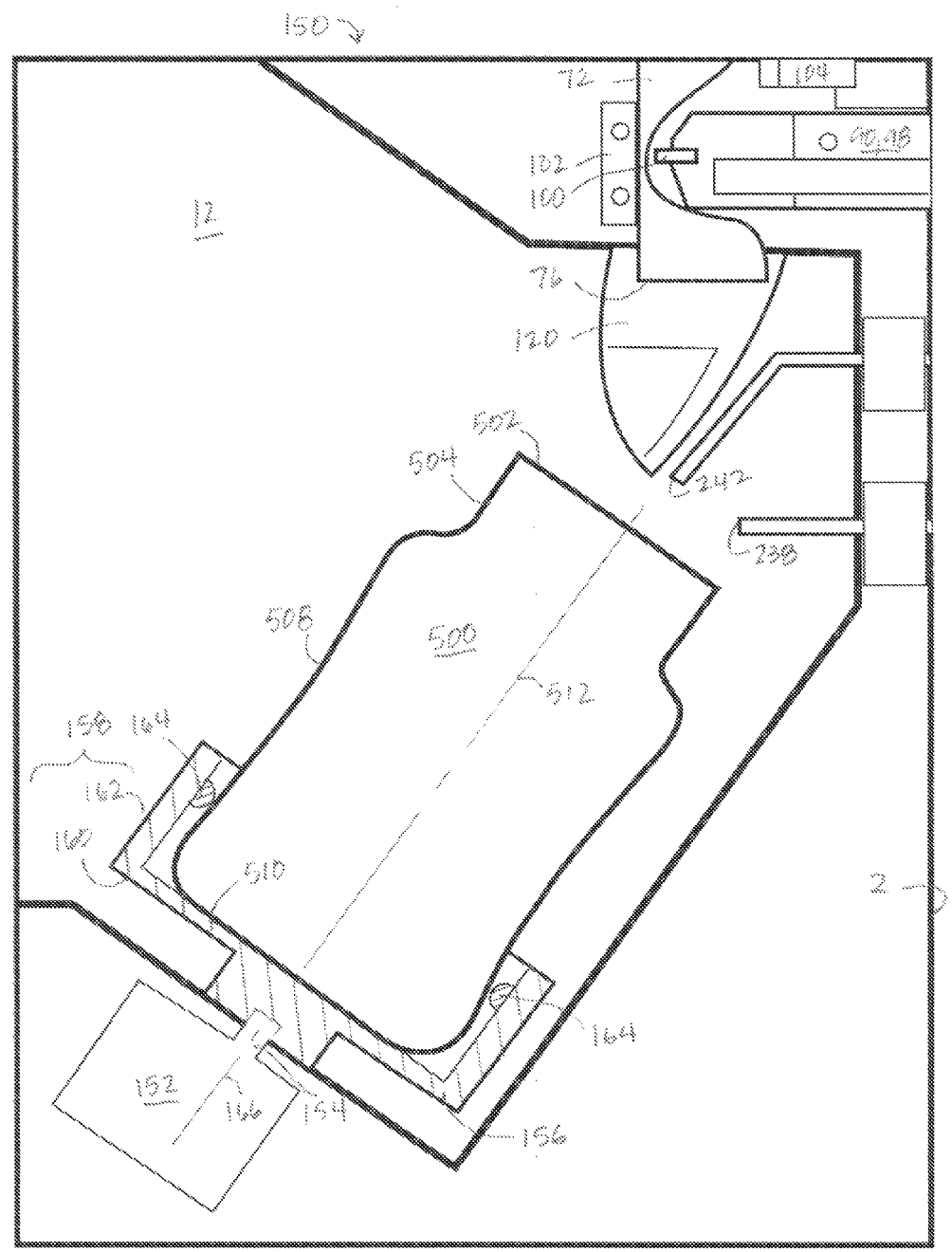
FIG. 4 is an enlarged view of the mixing assembly of the device of FIG. 1.

Referring to FIGS. 2 and 4, the mixing assembly 150 is disposed adjacent the bottom of the housing 2, and includes a mixing motor 152 and a container holder assembly 156. The mixing motor 152 is a reversible electric rotary motor and includes an output shaft 154. The holder assembly 156 is supported on the motor output shaft 154 so as to be rotated by the mixing motor 152. The mixing motor 152 is controlled by a controller 180 to rotate the holder assembly 156 relative to the housing 2 to achieve mixing of the contents of the container 500. For example, the mixing motor 152 is a reversible gear motor at speeds between 250 and 500 rpm, and can be controlled to provide an alternating rotation of the container between opposed rotation directions. In addition, or alternatively, the mixing motor can be controlled to provide periods of container non-rotation between periods of container rotation. Examples of specific mixing paradigms are discussed in detail below.

The holder assembly 156 includes a generally cup-shaped holder 158 having a base 160, and a sidewall 162 extending along a periphery of the base 160 in a direction perpendicular to the base 160. The base 160 is secured to the output shaft 154 by conventional means so that the holder 158 rotates coaxially with the output shaft 154. The holder 158 is sized so that diameter of the sidewall 162 is greater than the outer diameter of the container 500. Elastic tabs 164 are provided on the inner surface of the sidewall 162 so as to protrude radially inward, forming an opening into the holder 158 which is slightly less than the outer diameter of the container 500, and the container 500 is inserted into the holder 158 by pressing the container 500 through the tabs 164 until the container bottom 500 rests on the base 160. The container 500 is maintained within the holder 158 due to an interference fit between the tabs 164 and the sidewall 508 of the container 500.

The mixing motor 152 is mounted within the housing 2 so that the output shaft 154 is angled relative to the horizontal. As a result, the base 160 of the holder 158 is also angled relative to the horizontal, and thus the holder 158 will support the container 500 such that the bottom end 510 of the container 500 is disposed at an angle $\theta_2$ to the horizontal. In some embodiments, the angle of the container axis 512 relative to the horizontal $\theta_2$ is in the range of 45 degrees to 80 degrees. In other embodiments, the angle of the container axis 512 relative to the horizontal $\theta_2$ is in the range of 55 degrees to 60 degrees. In addition, the holder 158 is supported by the motor 152 within the housing so that the container 500 is held at a fixed angle relative to the vertical, and so that the bottle opening 502 is positioned below the dosing assembly 70 and chute 120 to receive the PIF.

Figure 5:
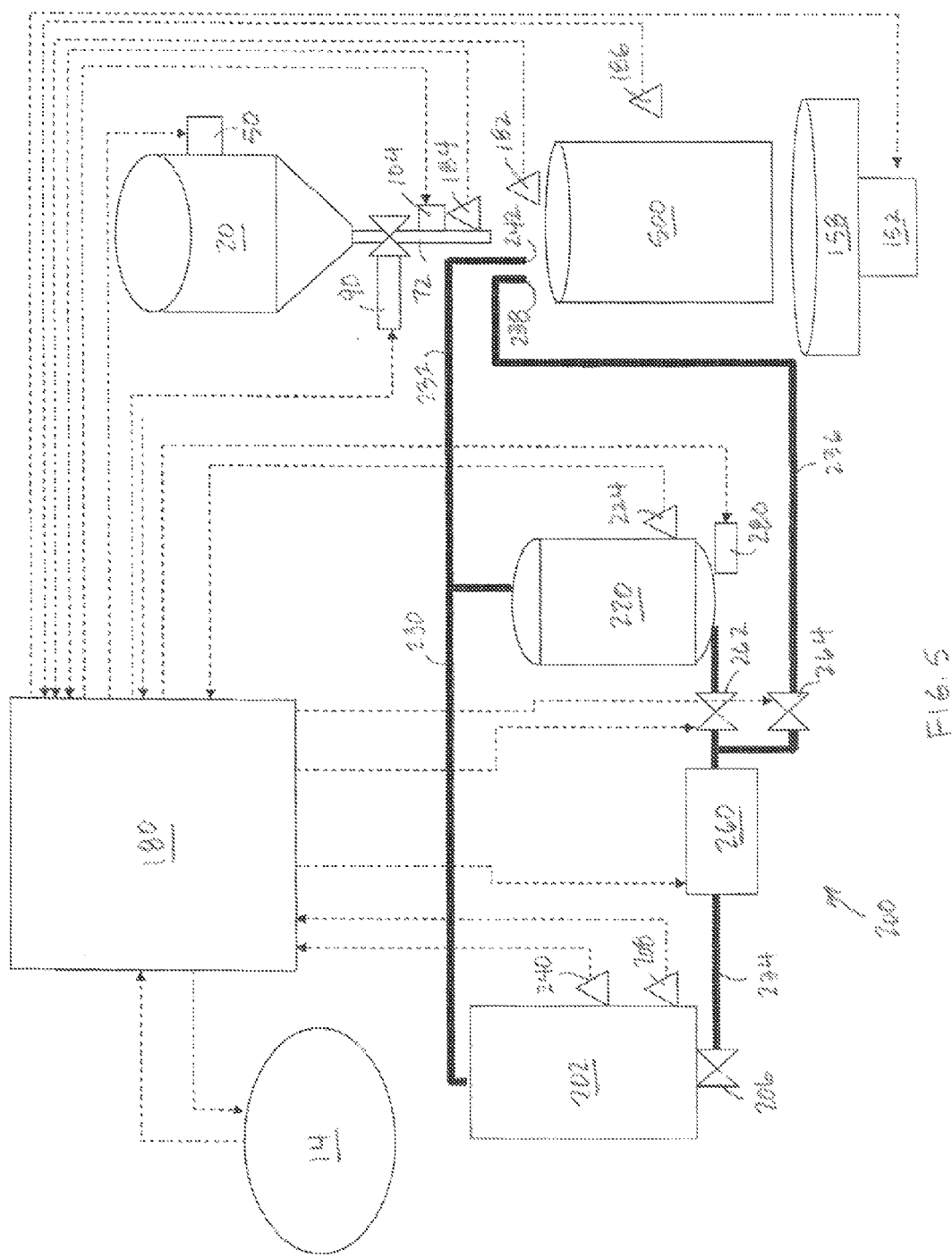
FIG. 5 is a schematic diagram of dilution assembly and control system of the device of FIG. 1.

Referring to FIGS. 2 and 5, the dilution assembly 200 serves as a liquid supply and has a removable and refillable ambient water storage tank 202 for storing unheated water, and a relatively smaller hot water storage tank 220 that is filled from the ambient water storage tank 202. The ambient water storage tank 202 is supported on the inner surfaces of the housing 2 adjacent the upper end of the housing 2 adjacent to the receptacle 20 and below the lids 8, 10. The ambient water storage tank 202 can easily be removed from the housing 2 through the opening 16 to permit cleaning. The top 210 of the ambient water storage tank 202 includes an opening 212 to permit filling, and the opening 212 is covered by a lid 204 to prevent contaminants from falling into the ambient water storage tank 202, for example when the housing lids 8, 10 are opened to refill the receptacle 20. In some embodiments, the ambient water storage tank 202 will hold about 32 ounces of water, and the hot water storage tank 220 will hold approximately 8 ounces of water.

The water within the ambient water storage tank 202 is supplied to a water pump 260 via a check valve 206 and a supply line 234. The check valve 206 allows outward flow from and prevents reverse flow back to the ambient water storage tank 202. The water pump 260 provides water to the hot water storage tank 220 via a check valve 262 that prevents reverse flow back from the hot water storage tank 220. A hot water delivery line 232 supplies hot water from the hot water storage tank 200 to a hot water outlet 242. In addition, the water pump 206 provides water to the ambient water outlet 238 via a check valve 264 that prevents reverse flow back from the outlet 238 and supply line 236. A vent line 230 joins the hot water delivery line 232 to permit venting of the ambient water storage tank 202 and the hot water storage tank 220. The water pump 260 is controlled by the controller 180 to determine the sequence and amount of water delivered, as discussed further below.

The hot water outlet 242 and ambient water outlet 238 are located in the vicinity of the chute 120 at a location overlying the container opening 502. The outlets 242, 238 are oriented to direct ambient water into the container 500. More particularly, the hot water outlet 242 is generally aligned with the container axis 512, and thus is arranged to direct hot water toward the container bottom 510. In addition, the ambient water outlet 238 has a different orientation than that of the hot water outlet 242. For example, the ambient water outlet 238 can be arranged to direct ambient water toward the container sidewall 508. In some embodiments, the ambient water outlet 242 is arranged to extend horizontally.

A water heater 280 is connected to the hot water storage tank 220 to heat the water stored therein. The water heater 280 is controlled by the controller 180 to provide hot water to the container at a temperature sufficient to pasteurize the reconstituted formula. As used herein, the term pasteurize means to expose a food to an elevated temperature for a period of time sufficient to destroy certain microorganisms, such as those that can produce disease or cause spoilage or undesirable fermentation of food, without radically altering taste or quality. For example, the water heater 280 is controlled to heat the water within the hot water storage tank 200 to temperatures in the range of 165 to 190 degrees F. In some embodiments, the user can provide input to the controller 180 via the display panel 14 to set the water heater 280 to a different temperature.

Sensors are strategically placed throughout the automated infant formula device 1 to monitor operating conditions and generate representative output signals. These include: a hot water storage tank temperature sensor 224; an ambient water tank water level sensor 208 that generates an output signal if the water level in the ambient water storage tank 202 drops below a preselected minimum; and a ready status indicator 186 that generates an output signal indicating that the container has been loaded into the automated infant formula device 1. Water temperature sensors 240, 182 are provided to detect and monitor temperature of the water at the ambient water storage tank 202 and within the container 500, respectively. In some embodiments, the sensor 182 for detecting the temperature of the liquid in the container 500 can be an infrared sensor. In addition, the automated infant formula device 1 includes a sensor 184 to detect whether PIF has been dispensed from the dosing assembly 70 into the mixing assembly 150. For example, the sensor 184 can detect whether a light beam passing through the flow path has been interrupted by PIF delivery.

The controller 180 receives the output signals from each of the control panel and display 14 and sensors, and controls the receptacle vibrator 50, the dosing tube vibrator 104, the pinch valve 90 and the components of the dilution assembly 200 according to pre-programmed and/or programmable parameters. In addition, the controller provides status signals to the control panel and display 14, and is operative in response to a user input received at control panel and display 14 to operate the system through a mix cycle.

Figure 6:
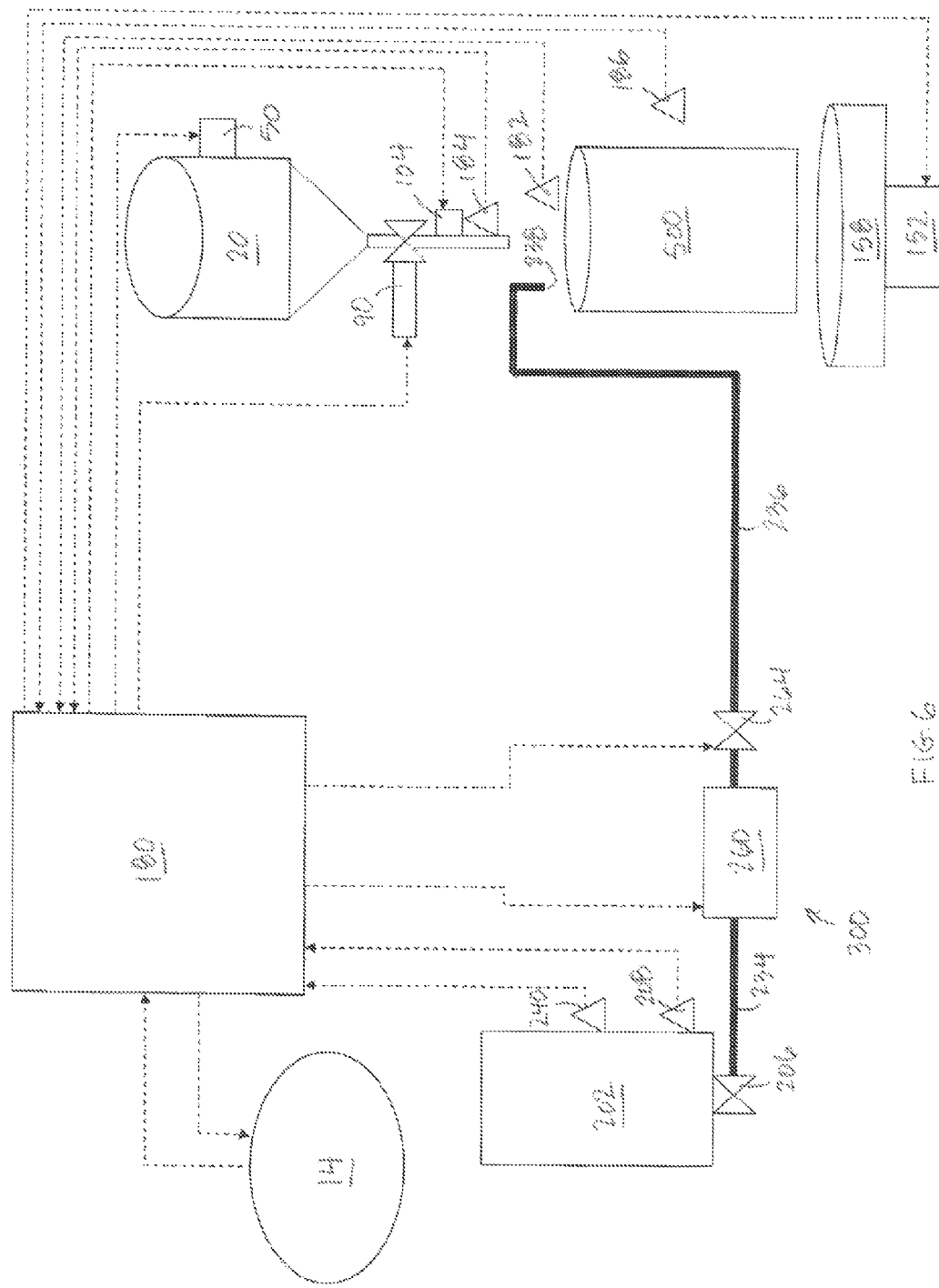
FIG. 6 is a schematic diagram of an alternative dilution assembly and the control system.

Referring to FIG. 6, it is appreciated that versions of the device 1 can be provided that do not require heated water. Such a device might allow for simply deactivating or eliminating the water heater 280 and temperature sensor 224. For example, an alternative dilution assembly 300 includes the removable and refillable ambient water storage tank 202 for storing unheated water. The ambient water storage tank 202 supplies water to the water pump 260 via a check valve 206 and a supply line 234. The check valve 206 allows outward flow from and prevents reverse flow back to the ambient water storage tank 202. The water pump 260 provides water to the ambient water outlet 238 using the supply line 236 via a check valve 264 that prevents reverse flow back from the outlet 238.

The device 1 has at least the following critical attributes:
1. The container 500 is held in the holder 158 at an angle $\theta_2$ of about 45 to 80 degrees from the horizontal. Testing has shown that mixing using a vertically oriented container position (90 degrees from the horizontal) does not provide a satisfactory beverage because when mixed in a vertically oriented position, the powder collects and clumps in the bottom edges of the container 500. Thus, the mixing angle $\theta_2$ is a critical element of the invention. It works by dispersing and configuring the powder in the container 500 to make thorough mixing possible. The angle $\theta_2$ range of 45 to 85 degrees was determined through testing to work well, and the angle $\theta_2$ range of 55 to 60 degrees was determined be optimal, since greater angles cause the formula to spill, and a less angle does not provide adequate mixing and results in powder collection on the container 500 walls.
    a. The container 500 is held in a holder that can rotate clockwise and/or counterclockwise at various rates of rotation and at various time periods between reversal of direction.
    b. The speeds of rotation are between 100 and 500 rpm.
    c. The time period between reversal of direction can vary from a few seconds (thus achieving an agitation rather than a rotation) to 10-15 seconds (thus allowing the establishment of a vortex in the mixing liquid).
2. The device 1 can accommodate the introduction of PIF into the container 500 first, before water is added, or the simultaneous introduction of water and PIF.
3. The device 1 can mix a full dose of PIF with a partial dose of hot water (roughly half to one third the water needed for full reconstitution of the PIF).
    a. This approach mixes water and PIF at about a 1 to 1 volume ratio in order to first heat the PIF to over 160° F. with hot water and hold the PIF/water mixture at this temperature for at least 15 seconds.
4. The formula is subsequently cooled to the final set point temperature and mixed to the desired dilution by adding additional water at ambient temperature.
    a. Complete reconstitution of the concentrated formula involves mixing water into the high temperature concentrated formula in an amount ranging from ⅓ to ⅔ of the total amount of water needed for complete reconstitution of the initial PIF.

The angled mixing configuration described above provides a controlled flow in the container 500, as the rotational speed and container angle determine the tangential vector of the spinning liquid.

Operation and Method of Use

Figure 7:
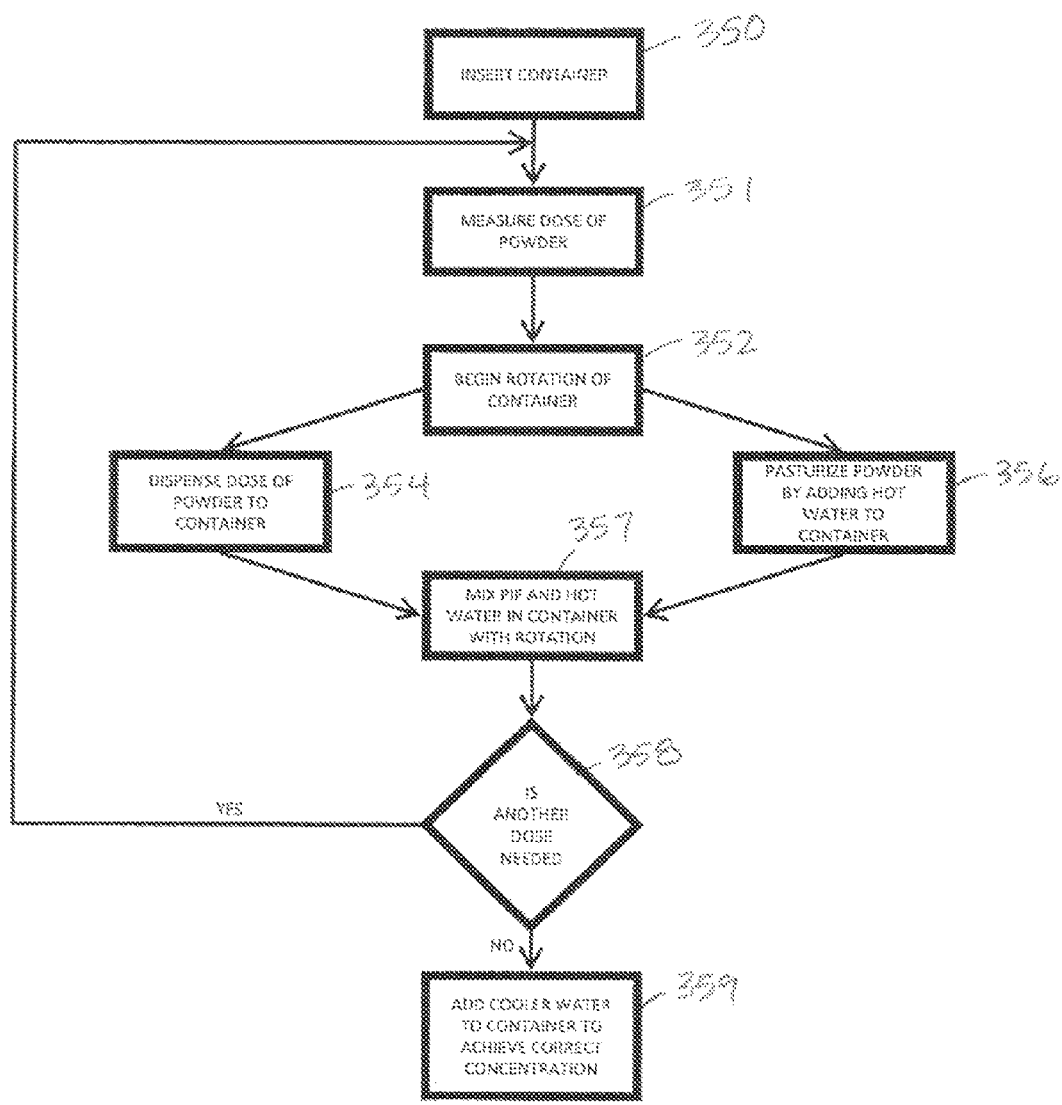
FIG. 7 is a flow diagram of the method of preparing infant formula using the device of FIG. 1.

With reference to FIG. 7, a method of dispensing PIF into a container 500 and preparing a reconstituted formula from the PIF is as follows:

1. Insert the container 500 into the recess 12 of the device and load into the holder 158 (step 350). The presence of the container 500 within the holder 158 can be detected using a sensor 186.

2. Measure a predetermined amount of PIF to be dispensed (step 351). This is achieved through closure of the pinch valve 90 and operation of the hopper vibrator 50 to shake the receptacle 20 in order to break up any holes, bridges or other non-homogeneities in the stored PIF, and to facilitate downward movement of the PIF within the receptacle 20. Importantly, operation of the hopper vibrator 50 serves to fill the dosing tube 72 with PIF. Here, "shaking" of the receptacle 20 can include application of a single mechanical pulse or a series of pulses (vibration). This step is performed, for example at the time of filling the receptacle 20 with PIF and prior to each dispensation of PIF.

3. Begin rotation of the container 500 (step 352). The container 500 is rotated at a rotational speed of 100-500 RPM.

4. While the container rotates, dispense PIF of desired dose into container 500 (step 354). This is achieved by opening the pinch valve 90 and operating the dosing tube vibrator 104 to facilitate the flow of the predetermined amount (ie, dose) of PIF out of the dosing tube 72, through the chute 120, and into the container 500 through the open top 502 of the container 500. The predetermined amount of PIF corresponds to the sum of a volume of the dosing tube 72 above the pinch valve 90 and the volume of powder disposed below the bridge formed by the powder bridging within the receptacle 20. Due to the powder bridging caused by the shape of the receptacle 20 including the sidewall angle $\theta_1$ at the transition from the receptacle 20 to the dosing tube 72, no secondary valve or other mechanism is required within receptacle 20 to achieve metering of the PIF. Moreover, the bridged powder prevents any undesired powder (that is, PIF above the bridge B) from flowing from the receptacle 20 itself into the container 500. Only the PIF below the powder bridge B that was contained in the dosing tube 72 is released into the container 500 when the pinch valve 90 is opened and the tube vibrator 104 is energized.

As the PIF flows out of the dosing tube 72 and into the angled container 500, the container 500 is rotated to spread out the PIF evenly. The container 500 is held at an angle $\theta_2$ which is required for complete mixing.

5. While the container rotates, pasteurize the PIF within the container 500 by adding hot water to the container 500 (step 356).

Simultaneously to or following the introduction of powder into the container 500, hot water is directed from the hot water storage tank 220 to the container 500. A volume of hot water is added that corresponds to roughly 50% (range of 33%-66%) of the total amount of water needed for complete reconstitution of the PIF.

6. Mix hot water and PIF in container 500 (step 357). This mixes the PIF at a concentrated level, and ensures sufficient time at temperature to pasteurize the concentrated formula. Depending on the size of the desired serving the duration, type and direction of rotation will vary, as discussed further below.

In some embodiments, the mixture of PIF and hot water to prepare 2 ounces of reconstituted formula is mixed according to the following dispensing and spinning sequence. In this case, the predetermined amount of PIF (i.e., a dose) corresponds to the amount of PIF required for obtaining 2 ounces of reconstituted formula.

| Direction/speed | Time |
|---|---|
| Dispense 1 dose of PIF and a portion of water | |
| Clockwise 450 rpm | 2 seconds |
| Counter clockwise 450 rpm | 2 seconds |
| Clockwise 450 rpm | 2 seconds |
| Counter clockwise 450 rpm | 2 seconds |
| Clockwise 450 rpm | 2 seconds |
| Counter clockwise 450 rpm | 2 seconds |
| Clockwise 450 rpm | 2 seconds |
| Counter clockwise 450 rpm | 2 seconds |

7. Based on the required serving size, the controller 180 determines whether additional water and PIF will need to be dispensed into the container 500 (step 358). For example, if four ounces of formula is needed, the following dispensing and spinning sequence is used.

| Direction/speed | Time |
|---|---|
| Dispense 1 dose of PIF and a portion of water | |
| Clockwise 450 rpm | 2 seconds |
| Counter clockwise 450 rpm | 2 seconds |
| Dispense 1 dose of PIF and a portion of water | |
| Clockwise 450 rpm | 2 seconds |
| Counter clockwise 450 rpm | 2 seconds |
| Clockwise 450 rpm | 2 seconds |
| Counter clockwise 450 rpm | 2 seconds |
| Clockwise 450 rpm | 2 seconds |
| Counter clockwise 450 rpm | 2 seconds |
| Clockwise 450 rpm | 2 seconds |
| Counter clockwise 450 rpm | 2 seconds |

For example, if six ounces of formula is needed, the following dispensing and spinning sequence is used.

| Direction/speed | Time |
|---|---|
| Dispense 1 dose of PIF and a portion of water | |
| Clockwise 450 rpm | 2 seconds |
| Counter clockwise 450 rpm | 2 seconds |
| Dispense 1 dose of PIF and a portion of water | |
| Clockwise 450 rpm | 2 seconds |
| Counter clockwise 450 rpm | 2 seconds |
| Dispense 1 dose of PIF and a portion of water | |
| Clockwise 450 rpm | 4 seconds |
| Counter clockwise 450 rpm | 4 seconds |
| Clockwise 450 rpm | 4 seconds |
| Counter clockwise 450 rpm | 4 seconds |

For example, if eight ounces of formula is needed, the following dispensing and spinning sequence is used:

| Direction/speed | Time |
|---|---|
| Dispense 1 dose of PIF and a portion of water | |
| Clockwise 450 rpm | 2 seconds |
| Counter clockwise 450 rpm | 2 seconds |
| Dispense 1 dose of PIF and a portion of water | |
| Clockwise 450 rpm | 2 seconds |
| Counter clockwise 450 rpm | 2 seconds |
| Dispense 1 dose of PIF and a portion of water | |
| Clockwise 450 rpm | 4 seconds |
| Counter clockwise 450 rpm | 4 seconds |
| Dispense 1 dose of PIF and a portion of water | |
| Clockwise 450 rpm | 4 seconds |
| Counter clockwise 450 rpm | 4 seconds |
| Clockwise 450 rpm | 4 seconds |
| Counter clockwise 450 rpm | 4 seconds |

As discussed above, prior to each dispensation of a dose of PIF into the container 500, the method step 351 is performed.

8. Add sufficient ambient water to the container 500 to achieve desired PIF concentration (step 359). In particular, when the mixing cycle is complete, ambient water is pumped from the ambient water storage tank 202 into the container 500 completing the reconstitution of the PIF. By using relatively cool water to complete dilution, the formula can be quickly cooled from pasteurization temperatures to a comfortable temperature for consumption, for example a temperature corresponding to body temperature or 98 degrees F.+/−5 degrees F. During this step, the container 500 continues to rotate. The rotational speed of the earlier steps can be maintained, or alternatively, the container can be rotated at a reduced rotational speed. Thus the range of possible rotational speeds can include 1 to 500 RPM. The duration of rotation during this step is dependent on the amount of water added.

The above method provides several advantages. For example, since the container is held at an angle and rotated while the powder is dispensed, the powder is spread out over the sidewalls of the container, preventing formation of lumps and preventing formation of unmixed aggregations of powder or powder paste along the container bottom or sidewalls that never fully dissolves. Because the powder has been spread out along the sides of the container 500, when water is added to the container, complete and uniform mixing of the powder and water is achieved, even during steps of highly concentrated formulation such as occurs during pasteurization. In addition, since the container is held at an angle and rotated while the water is dispensed, better mixing agitation is provided, facilitating the complete and uniform mixing of the powder and water. Furthermore, since water is added to the container by directing the flow of water to a sidewall of the container 500, formation of bubbles within the reconstituted formula is minimized.

Compared to preparation by hand, this automated device 1 and method ensures a consistent preparation including repeatable and accurate dosing of the PIF, uniform mixing of the reconstituted PIF, correct final delivery temperature and pasteurization of the resulting formula. In particular, the device 1 provides variable dose options, effective formula mixing, improved cleanability, (no mixed formula touches any part of the machine), and mixing in the bottle (so no parts need to be cleaned prior to the next serving). Moreover, these features are achieved using a relatively simple device having only a single valve mechanism to control PIF flow.

Although the device 1 and method described herein are directed to reconstituting PIF, the device 1 and method are not limited to this application. For example, other powders may be reconstituted using this device and method, including dried coffees, teas, powders for flavored drinks including those having chocolate, fruit or other flavors, and powders for nutritional supplements. In addition, the device 1 and method described herein are not limited to reconstituting beverages for human consumption, but have other applications as well. For example, the device 1 and method can be used to prepare formula for feeding young livestock Although the container 500 is described herein as conventional cylindrical baby bottle, the device 1 is not limited to being used with this type of container. For example, the baby bottle may be provided having a non-cylindrical shape. More specifically, the baby bottle may have a non-linear longitudinal axis, non-linear sidewalls, or both. The container may be of a different type, including but not limited to a travel mug, water bottle, drinking glass or coffee cup. In addition, the container may be of a different shape, including having a polygonal cross section, or may be proportioned to be wider than it is tall. The container may be sized and formed of a material appropriate for achieving repeatable temperature and mixing constitution. In addition, the container may include features that are customized for the automated infant formula device 1, which may include the adaptation of connection holding points, material choices and/or thickness of material.

Although the receptacle 20 is illustrated herein as being generally pyramid shaped including a rectangular top 22, and having four sidewalls 26a-d, the receptacle 20 is not limited to this shape and may be formed having a single arcuate sidewall so as to be generally conically shaped. Similarly, the open bottom 24 of the receptacle 20 may be polygonal in cross sectional shape rather than cylindrical.

Although the receptacle 20 is described as being sufficiently sized to accommodate several servings of PIF, the receptacle 20 is not limited to this size. For example, the receptacle may be provided in a size sufficient for a single serving.

Figure 8:
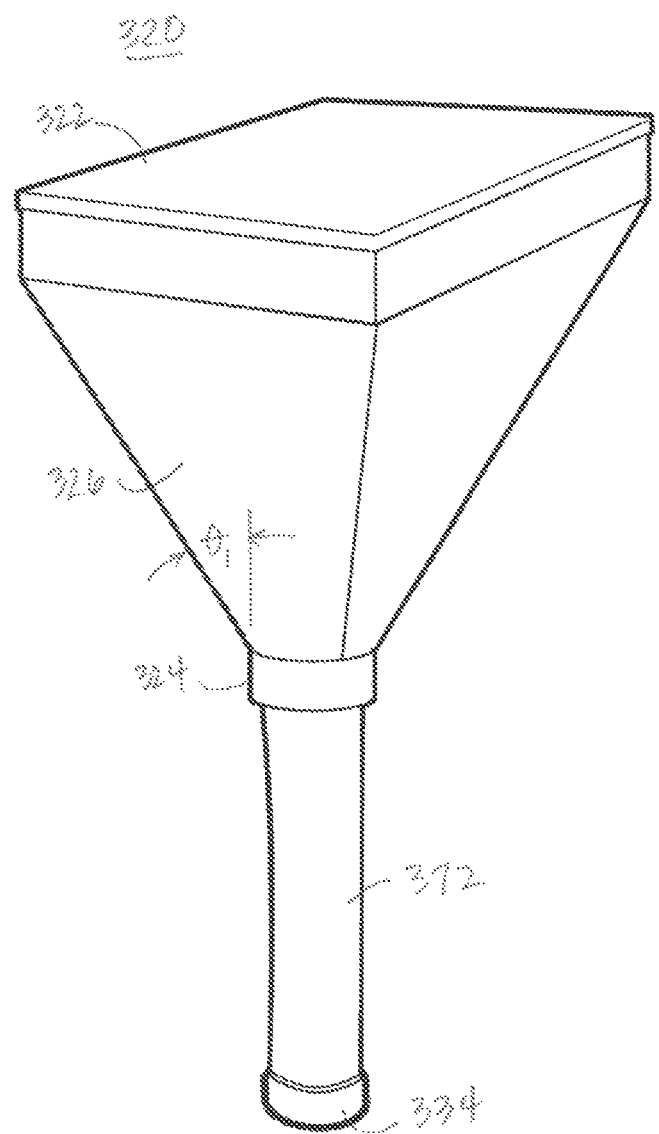
FIG. 8 is a perspective view of an alternative powder receptacle for use in the device of FIG. 1.

Referring to FIG. 8, although the receptacle 20 is illustrated herein as being a refillable hopper mounted within the housing 2, the invention is not limited to this embodiment. For example, the receptacle 20 and dosing tube 72 may be replaced with a pre-filled and sealed hopper-shaped disposable cartridge 320. The cartridge 320 is formed having tapered sidewalls 326 including the taper angle $\theta_1$ selected to cause bridging of the PIF at or slightly above the second end 324 of the receptacle 320. In addition, the upper end 322 of the cartridge 320 is closed, and the open lower end 324 is connected to a pre-connected or integrally formed dosing tube 372, which is sealed at a lower end with a peel-off cover 334. When the PIF has been completely dispensed and the cartridge 320 is empty, the empty cartridge 320 is removed from the housing 2, and replaced with a full cartridge 320, whereby any mess and inconvenience of cleaning and refilling the receptacle 20 is avoided. In other embodiments, the receptacle 320 may be formed without a dosing tube 372, and instead be configured to be assembled with the dosing tube 72 of the device 1. In this case, the lower end 324 of the cartridge can be directly sealed with the cover 334.

Figure 9:
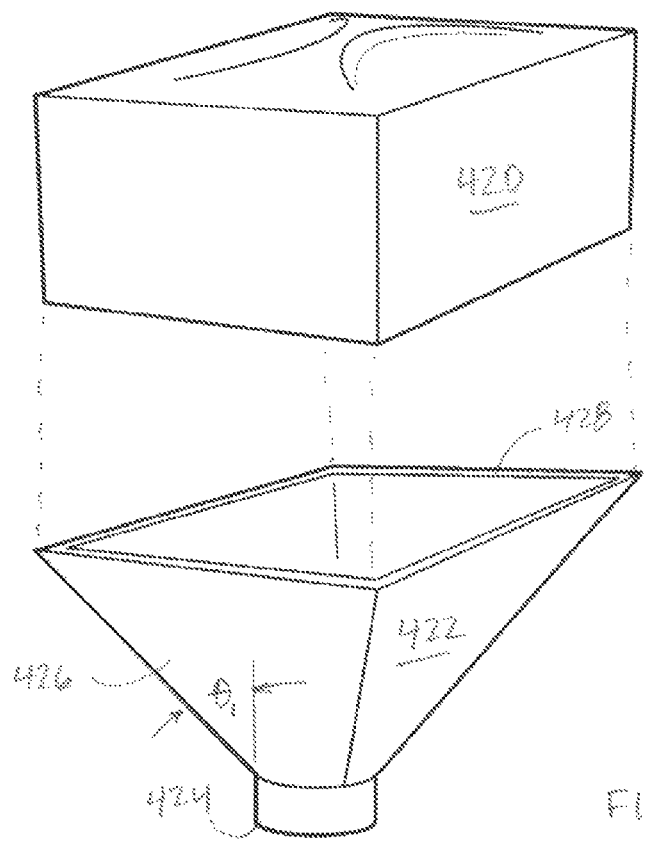
FIG. 9 is an exploded perspective view of another alternative powder receptacle for use in the device of FIG. 1.
Figure 10:
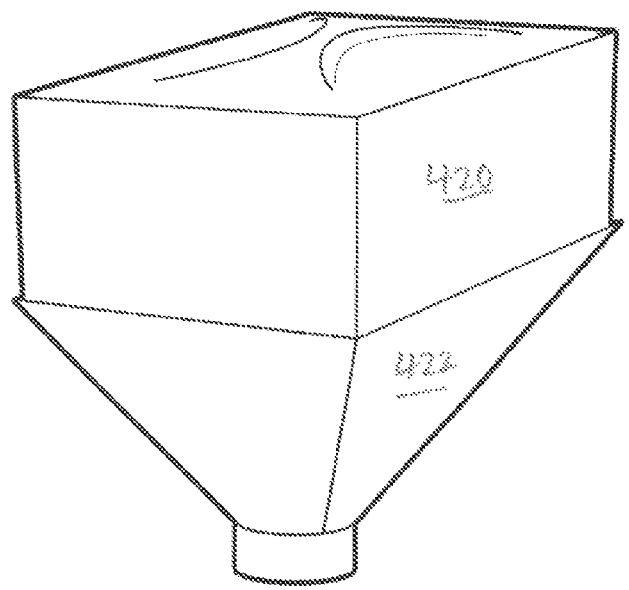
FIG. 10 is a perspective view of the receptacle of FIG. 9 in an assembled configuration.

Referring also to FIGS. 9 and 10, an alternative disposable cartridge 420 may be used with the device 1 that is not limited to a hopper shape. Instead, as shown in FIG. 9, the pre-filled and sealed disposable cartridge 420 can be formed in a box shape that is convenient for shipping and storing PIF, and used within the device 1 along with a modified receptacle 422. In particular, the receptacle 422 is formed having tapered sidewalls 426 including the taper angle $\theta_1$ selected to cause bridging of the PIF at or slightly above the second end 424 of the receptacle 422. In addition, the edge 428 at the open upper end of the receptacle 422 is formed to connect with a lower end of the cartridge 420 (FIG. 10), whereby the receptacle 422 is automatically loaded with PIF.

Although the dosing assembly 70 is described as including a cylindrical dosing tube 72, the dosing tube 72 is not limited to being cylindrical. For example, the dosing tube may be of any closed sectional shape including polygonal and irregular.

Although the dosing assembly 70 is described as including the pinch valve 90, the dosing assembly 70 is not limited to using the pinch valve 90, and control of the flow of PIF from the second end 76 of the dosing tube 72 can be accomplished using other valve mechanisms. For example, an alternative mechanism could obstruct the passageway 80 within the dosing tube 72 by sufficient bending of the dosing tube 72. Moreover, although the pinch valve 90 is disclosed as retracting from the dosing tube 72 to permit elastic opening of the dosing tube 72, in other embodiments, the dosing tube 72 may be merely flexible rather than elastic, and a pinch valve 90 may be secured to the tube itself so that when retracted, the pinch valve 90 mechanically opens the tube passageway 80.

Although the holder 158 of the mixing assembly employs elastic tabs 164 to secure the container 500 within the holder 158, the mixing assembly is not limited to this and other mechanisms may be used to secure the container 500 within the holder 158. In one example, spring-loaded rigid tabs can be used to replace the elastic tabs. In another example, the holder 158 can be replaced with a clip configured to secure the container 500.

Although the chute 120 is illustrated herein as being supported within an opening 15 on the housing 2, this configuration is non-limiting. For example, the chute 120 may be formed integrally with the dosing tube 72.

Although the dilution assembly 200 includes separate hot water and ambient water outlets 242, 238, the dilution assembly 200 is not limited to this configuration. For example, the dilution assembly 200 may include a single outlet that is fed from both the hot and ambient water tanks.

Although the examples of dispensing and spinning sequences refer to initially spinning the container 500 in a clockwise rotational direction about the container axis 512, followed by a subsequent spinning of the container 500 in a counterclockwise rotation direction, the spinning sequence is not limited to this. For example, the initial rotation direction can be counterclockwise, followed by a subsequent clockwise rotation direction.

Figure 11:
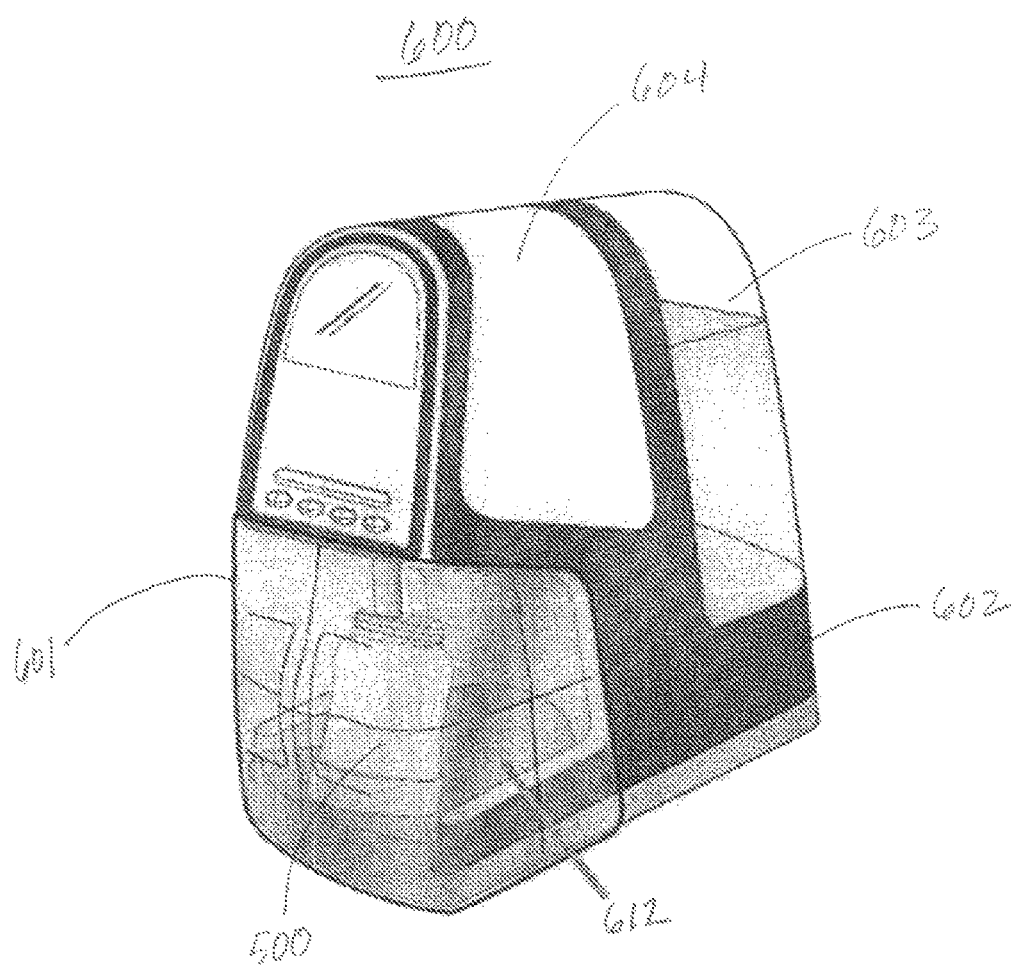
FIG. 11 is an alternative embodiment of the automated infant formula device.

Referring to FIG. 11, an alternative embodiment automated infant formula device 600 which includes the hopper assembly 18, dosing assembly 70, dilution assembly 200 and mixing assembly 150 described above stored within a housing 602. The device 600 also includes a front cover 601 which covers the recess 612 provided in the front of the device 600 into which the container 500 is inserted, providing a closed sterilization compartment within the device 600. In addition, the device 600 further includes a container sterilizer (not shown) which sterilizes the container 500 received within the compartment. For example, sterilization can be achieved by exposing the container 500 to UV light for a predetermined period of time, or by providing hot water to the container 500 at temperatures sufficient to create a sterilizing steam within the compartment. The device housing 602 may also include a transparent portions 603, 604 to permit visual monitoring of the fill levels of the receptacle 20 and ambient water tank 202.

Selected illustrative embodiments of the invention are described above in some detail. It should be understood that only structures considered necessary for clarifying the present invention have been described herein. Other conventional structures, and those of ancillary and auxiliary components of the system, are assumed to be known and understood by those skilled in the art. Moreover, while a working example of the present invention has been described above, the present invention is not limited to the working example described above, but various design alterations may be carried out without departing from the present invention as set forth in the claims.

What is claimed is:

1. An apparatus for preparing within a container a reconstituted beverage from a powder, the apparatus comprising:
    a receptacle configured to contain the powder;
    a measuring device configured to receive the powder from the receptacle and dispense the powder into the container;
    a liquid supply configured to dispense liquid into the container;
    a mixing device configured to mix contents of the container while supporting the container such that a closed base end of the container is disposed at an angle relative to a horizontal angle; and
    a vibrator configured to vibrate the receptacle to dispense the powder from the receptacle into the measuring device.

2. The apparatus of claim 1, wherein the measuring device includes:
    a tube having a first end connected to an outlet of the receptacle, and an open second end opposed to the first end; and
    the apparatus further comprises a valve disposed between the first end and the open second end, the valve configured to control powder flow from the open second end.

3. The apparatus of claim 2, wherein a cross-sectional dimension of the tube is determined based on properties of the powder to be dispensed.

4. The apparatus of claim 2, wherein an axial position of the valve relative to a longitudinal axis of the tube is adjustable, and wherein the axial position is determined based on an amount of the powder to be dispensed.

5. The apparatus of claim 2, wherein the valve is configured to selectively prevent the powder from passing through the open second end of the tube.

6. The apparatus of claim 2, wherein the valve is configured to move a sidewall of the tube between a first tube sidewall position in which the powder can pass through the tube and a second tube sidewall position in which the powder is prevented from passing through the tube.

7. The apparatus of claim 1, wherein the receptacle comprises:
    an open receptacle first end having a first dimension;
    an open receptacle second end opposed to the open receptacle first end, the open receptacle second end having a second dimension; and
    a receptacle sidewall connecting the open receptacle first end and the open receptacle second end, a portion of the receptacle sidewall being angled so as to converge from the open receptacle first end to the open receptacle second end, the portion having an angle configured to cause powder bridging at or above the open receptacle second end.

8. The apparatus of claim 1, wherein the receptacle is a pre-filled and sealed disposable cartridge.

9. The apparatus of claim 1, wherein the liquid supply includes a first supply tube and a second supply tube, the first supply tube and the second supply tube arranged so that the first supply tube directs fluid into the container in different direction than a direction of the second supply tube.

10. The apparatus of claim 1, wherein the liquid supply includes a first supply tube and a second supply tube, the first supply tube and the second supply tube are configured so that the first supply tube delivers liquid at a different temperature than that of the second supply tube.

11. The apparatus of claim 1, further comprising a sensor configured to detect powder flow from the measuring device.

12. An apparatus for preparing within a container a reconstituted beverage from a powder, the apparatus comprising:
    a receptacle configured to contain the powder, the receptacle comprising:
        a first end having a first dimension,
        a second end opposed to the first end, the second end having a second dimension, and
        a sidewall connecting the first end and the second end, a portion of the sidewall being angled so as to converge from the first end to the second end, the portion having an angle configured to cause powder bridging at or above the second end;
    a measuring device configured to receive powder from the second end of the receptacle, the measuring device further configured to dispense a predetermined amount of powder into the container, the predetermined amount of powder corresponding to a sum of a volume of the measuring device and a volume of powder disposed below a bridge formed by the powder bridging; and
    a vibrator configured to vibrate the measuring device to dispense the powder from the measuring device into the container.

13. The apparatus of claim 12, further including a mixing device configured to mix contents of the container while supporting the container such that a closed base end of the container is disposed at an angle relative to a horizontal angle.

14. The apparatus of claim 13, wherein the mixing device is configured to mix the contents of the container by rotation of the container about an axis perpendicular to the closed base end of the container.

15. The apparatus of claim 14, wherein the mixing device is configured to mix the contents of the container by alternating the rotation of the container between opposed rotation directions.

16. The apparatus of claim 12, further comprising a chute disposed between the measuring device and the container, the chute configured to direct the powder from the measuring device into the container such that a direction of powder flow is changed between the measuring device and the container.

17. The apparatus of claim 12, further comprising a mixing device configured to mix contents of the container, the mixing device comprising:

a holder configured to secure the container; and a motor configured to rotate the holder.

18. An apparatus for preparing within a container a reconstituted beverage from a powder, the apparatus including:

a receptacle configured to contain the powder;

a measuring device configured to receive the powder from the receptacle and dispense the powder into the container;

a liquid supply configured to dispense liquid into the container;

a mixing device configured to mix contents of the container while supporting the container such that a closed base end of the container is disposed at an angle relative to a horizontal angle; and a sensor configured to detect powder flow from the measuring device.

19. The apparatus of claim 18, wherein the receptacle comprises:

an open receptacle first end having a first dimension;

an open receptacle second end opposed to the open receptacle first end, the open receptacle second end having a second dimension; and a receptacle sidewall connecting the open receptacle first and the open receptacle second end, a portion of the receptacle sidewall being angled so as to converge from the open receptacle first end to the open receptacle second end, the portion having an angle configured to cause powder bridging at or above the open receptacle second end, wherein the measuring device includes a tube having a tube first end connected to the open receptacle second end, and an open tube second end opposed to the tube first end, and the apparatus further comprising a valve disposed between the tube first end and the open tube second end, the valve configured to control powder flow from the open tube second end, wherein a predetermined amount of powder corresponds to a sum of a volume of the measuring device above the valve and a volume of powder disposed below a bridge formed by the powder bridging.

20. The apparatus of claim 18, wherein the liquid supply is configured such that a first supply tube delivers liquid at a temperature to pasteurize the reconstituted beverage.

* * * * *